(12) United States Patent
Sturt et al.

(10) Patent No.: US 7,213,793 B2
(45) Date of Patent: May 8, 2007

(54) INVERTIBLE STORAGE COMPARTMENT DIVIDER

(75) Inventors: Alan Sturt, West Bloomfield, MI (US); James M Hutek, St. Clair Shores, MI (US); James A Mulvihill, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 193 days.

(21) Appl. No.: 10/907,996

(22) Filed: Apr. 24, 2005

(65) Prior Publication Data

US 2006/0237611 A1    Oct. 26, 2006

(51) Int. Cl.
*A47K 1/08* (2006.01)

(52) U.S. Cl. ............... 248/311.2; 248/310; 248/313; 224/926; 224/281

(58) Field of Classification Search ............ 248/311.2, 248/310, 313; 224/926, 281
See application file for complete search history.

(56) References Cited

U.S. PATENT DOCUMENTS

| | | | |
|---|---|---|---|
| 4,040,659 A | 8/1977 | Arnold | 297/194 |
| 4,417,764 A | 11/1983 | Marcus et al. | 297/194 |
| 4,836,488 A | 6/1989 | Ross | 248/346.11 |
| 5,054,733 A | 10/1991 | Shields | 248/313 |
| 5,297,767 A * | 3/1994 | Miller et al. | 248/311.2 |
| 5,330,146 A | 7/1994 | Spykerman | 248/311.2 |
| 5,433,361 A * | 7/1995 | O'Malley | 224/274 |
| 5,702,041 A * | 12/1997 | Sun et al. | 224/539 |
| 5,704,579 A | 1/1998 | Celentino et al. | 248/311.2 |
| 5,762,307 A | 6/1998 | Patmore | 248/311.2 |
| 5,791,617 A * | 8/1998 | Boman et al. | 248/311.2 |
| 5,829,726 A * | 11/1998 | Withun | 248/311.2 |
| 5,839,710 A * | 11/1998 | Hubbard | 248/311.2 |
| 5,921,519 A * | 7/1999 | Dexter et al. | 248/311.2 |
| 6,230,948 B1 * | 5/2001 | Steiger et al. | 224/539 |
| 6,412,861 B1 * | 7/2002 | Herman et al. | 297/146 |
| 2005/0000847 A1 * | 1/2005 | McNeeley | 206/527 |

* cited by examiner

*Primary Examiner*—Carl D. Friedman
*Assistant Examiner*—Michael McDuffie
(74) *Attorney, Agent, or Firm*—Bruce E Harang

(57) ABSTRACT

A vehicle storage compartment/cupholder assembly having a molded base into which is mounted a pair of flexible invertible dividers that allow for the secure retention of various sized beverage containers. The flexible invertible dividers may be mounted and tensioned by an internal or external flexible divider spring. The molded base may have a liner mounted therein which may be a liquid barrier, a tensioning device in place of a traditional spring, or both.

14 Claims, 4 Drawing Sheets

INVERTIBLE STORAGE COMPARTMENT DIVIDER

BACKGROUND OF THE INVENTION

1. Field of the Invention

The present invention generally relates to a vehicle storage compartment and divider assembly, and more particularly to a vehicle cupholder assembly having a one-piece cupholder base in which is mounted a pair of flexible invertible dividers that allow for the secure retention of various sized beverage containers.

2. Description of the Related Art

The prior art includes a variety of cupholders or container holders which are used for supporting cups, cans, or other beverage containers in vehicles which are selectively accessible to the vehicle passengers or occupants.

Some such cupholder devices include adjustability features for holding containers of various sizes. However, such adjustable cupholders generally require a number of components be assembled to provide this adjustability. In addition, some so these devises require the use of adjustable cupholder arms. Several of these prior art cupholders also requires that the cupholder arms be manually collapsed fully before they can be adjusted outward to receive a larger container. This may be inconvenient or awkward for a vehicle occupant, particularly the driver.

Other cupholders have pre-sized molded beverage container openings which do not allow for the secure holding of smaller sized beverage containers or use with beverage containers larger than the pre-sized openings.

For example, U.S. Pat. No. 4,040,659 issued Aug. 9, 1977 to Arnold teaches a food tray mountable in a vehicle and capable of holding a beverage container.

U.S. Pat. No. 4,417,764 issued Nov. 29, 1983 to Marcus et al teaches an armrest mounted container holder having a structure which supports two or more beverage containers in the armrest area of a vehicle.

U.S. Pat. No. 4,836,488 issued Jun. 6, 1989 to Ross teaches a coaster with an adjustable means for retaining a beverage container using a hook and shock cord.

U.S. Pat. No. 5,054,733 issued Oct. 8, 1991 to Shields teaches a single opening beverage container holder having multiple flexible members to secure a beverage container therein.

U.S. Pat. No. 5,330,146 issued Jul. 19, 1994 to Spykerman teaches an articulating cup holder utilizing multiple parts and pivot pins to achieve the articulating function.

U.S. Pat. No. 5,704,579 issued Jan. 6, 1998 to Celentino et al teaches the use of multiple magnets to hold a drink container in a cup holder.

U.S. Pat. No. 5,762,307 issued Jun. 9, 1998 to Patmore teaches a cup holder using multiple pieces and pivot pins to allow articulation.

Accordingly, it is desirable to provide an adjustable vehicle cupholder structure for firmly securing containers of various sizes, and which does not require the assembly of a plurality of moving parts or removable parts to form the cupholder units.

DISCLOSURE OF THE INVENTION

The present invention provides advantages and alternatives over the prior art by providing a cupholder assembly in which a pair of flexible dividers are used to allow the secure holding of various sized beverage containers.

According to a further aspect of the present invention, there is provided a cupholder having changeable storage areas without the need for removing divider parts.

According to yet another aspect of the present invention there is provided a cupholder utilizing a minimum of space and which provides for variable cupholder size compartments and provide storage for other items therein as well.

According to a yet further aspect of the present invention there is provided a storage compartment and divider assembly adapted for use in a vehicle for supporting containers, the vehicle having a receiving aperture for receiving the storage compartment and divider assembly, the storage compartment and divider assembly comprising: a storage tray having a bottom and sidewalls proportioned to accept various sized containers wherein said sidewalls have two pair of opposing openings; two invertible flexible dividers, each said divider mounted in one pair of said opposing openings in said storage tray sidewalls, and side invertible flexible dividers defining one large container holder or two small container holders; and an invertible flexible divider tensioning device to maintain the desired position of said divider; thereby providing for securing various sized beverage containers and the like in a vehicle.

According to still another aspect of the present invention there is provided a storage compartment and divider assembly adapted for use in a vehicle for supporting containers, the vehicle having a receiving aperture for receiving the storage compartment and divider assembly, the storage compartment and divider assembly comprising: a storage tray having a bottom and sidewalls proportioned to accept various sized containers wherein said sidewalls have two pair of opposing openings; a liner mounted within said storage tray and having an invertible flexible divider end mounting groove located over each of said two pair of opposing openings; two invertible flexible dividers, each said divider mounted in one pair of said mounting grooves in said liner located over each of said opposing openings in said storage tray sidewalls, and side invertible flexible dividers defining one large container holder or two small container holders; and an invertible flexible divider tensioning device to maintain the desired position of said divider; thereby providing for securing various sized beverage containers and the like in a vehicle.

The present invention thus advantageously provides a storage device which securely holds various sized containers with a minimum of parts and which is easily changed to accept different sizes of containers.

DESCRIPTION OF THE PREFERRED EMBODIMENTS OF THE INVENTION

Figure 1:
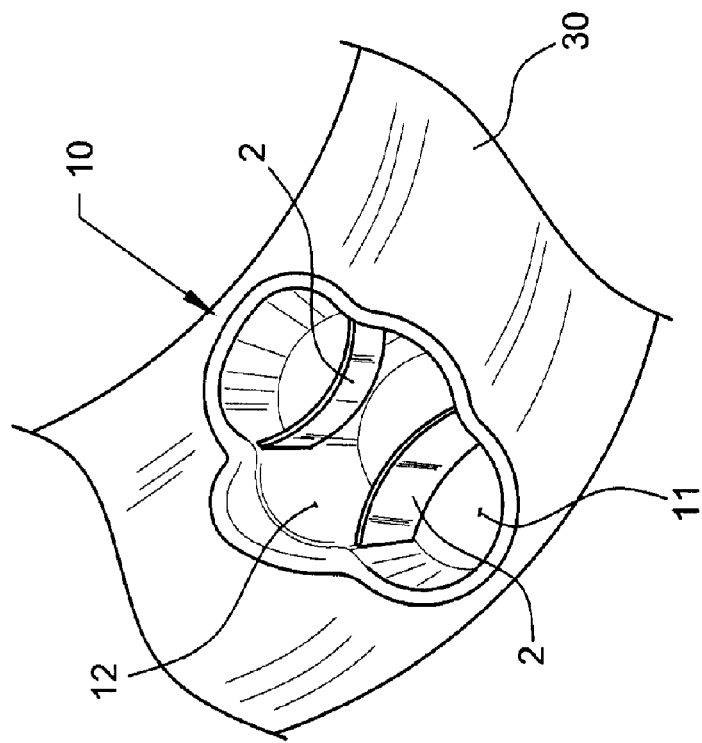
FIG. 1 shows a perspective view of one preferred embodiment of the present invention adapted to secure a single large beverage container.
Figure 2:
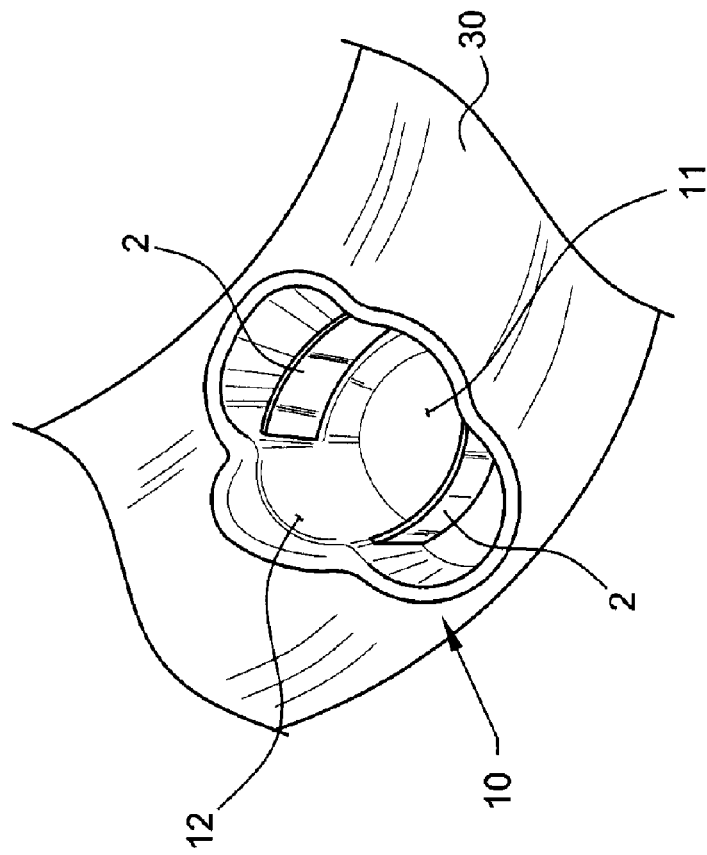
FIG. 2 shows a perspective view of the preferred embodiment of the present invention shown in FIG. 1 adapted to secure two small beverage containers.

Reference will now be made to the drawings, wherein to the extent possible like reference numerals are utilized to designate like components throughout the various views. Referring to FIGS. 1 and 2, which present a preferred embodiment of the present invention storage compartment having invertible dividers wherein the invertible dividers are positioned to hold securely a single large beverage container in FIG. 1 and to hold securely a one or two smaller beverage containers in FIG. 2.

As further shown in FIGS. 1 and 2, is a partial console 30 having storage compartment 1 mounted therein. Storage compartment 10 preferably comprises a molded tray of a desired shape having a bottom 11 and sidewalls 12 for receiving beverage containers, and further having permanently mounted therein two flexible, invertible dividers 2. FIG. 1 shows the dividers 2 positioned to secure a single large beverage container. FIG. 2 shows the dividers 2 positioned to secure one or two small beverage containers.

Figure 3:
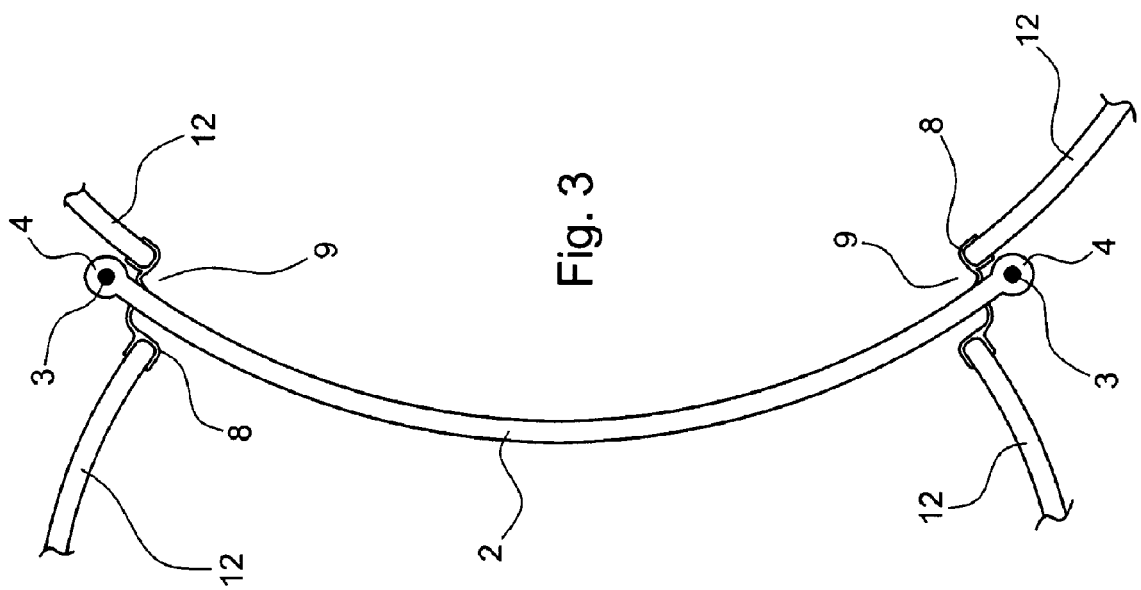
FIG. 3 shows a partial top plan view of one preferred divider mounting system of the present invention.

Referring now to FIG. 3, there is shown a partial section top plan view of a molded storage tray (which is a detailed view of the divider of FIG. 1), through which pass the ends of a flexible divider 2. The flexible divider 2 having a spring retaining end portion 4 into which is mounted an end of a spring 3. The spring 3 providing a tensioning force on said flexible divider 2 such that the flexible divider 2 stays in a desired beverage container accepting position until changed. It is to be understood that there are a pair of opposing openings 9 and flexible closeouts 8 for each of two flexible dividers 2.

Figure 4:
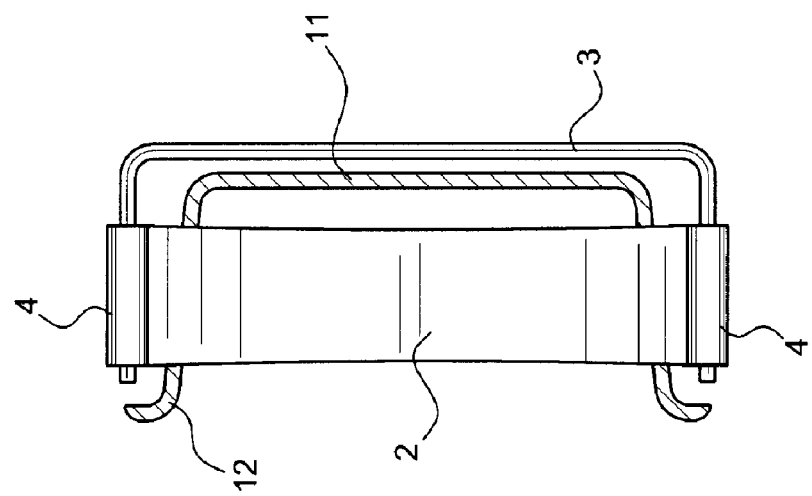
FIG. 4 show a cross-section view of the preferred divider of FIG. 3.

Turning now to FIG. 4, there is shown the a cross section plan view of the embodiment of the present invention shown in FIG. 3 having flexible divider 2 mounted in openings 9 through flexible closeouts 8. Further shown are tray sidewalls 12 and tray bottom 11 as well as spring 3 ends mounted in the spring retaining end portions 4 of flexible divider 2. In this embodiment the spring 3 has a generally U-shape and when mounted is located behind tray sidewalls 12 and under tray bottom 11. Preferably, said spring 3 comprises substantially round spring steel wire.

Figure 5:
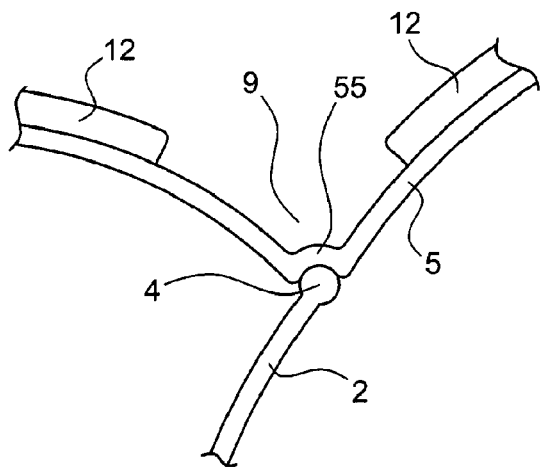
FIGS. 5a, 5b, and 5c show another preferred divider mounting system and illustrating the movement of the mounting system as the divider is repositioned.
Figure 5:
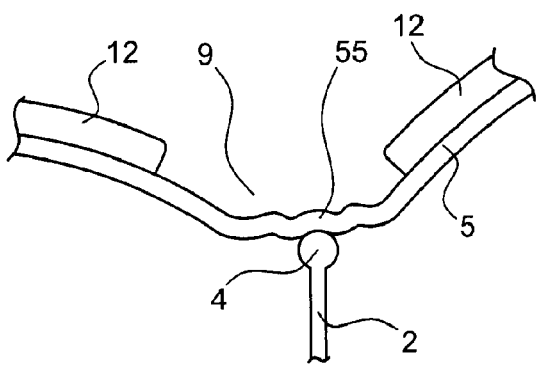
Figure 5:
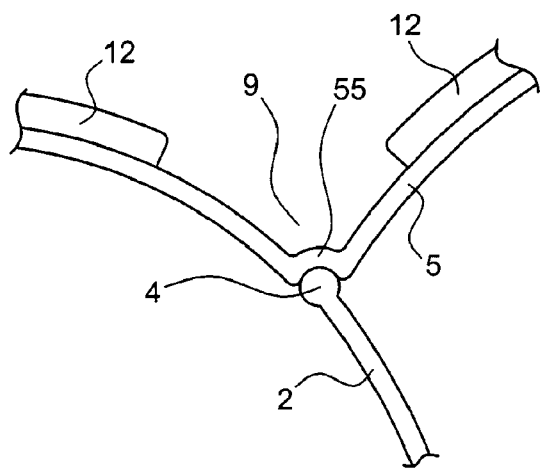

FIGS. 5a, b, and c show partial section top plan views of another preferred embodiment of the present invention wherein the flexible divider 2 having end portions 4 mounted in a retaining grooves 55 of a storage tray flexible liner 5 located against the inside of said sidewalls 12 or of said sidewalls 12 and said bottom 11. FIG. 5a shows the flexible divider 2 in a position as shown in FIG. 1 and the flexible liner 5 in its normal rest position. FIG. 5b shows the flexible divider 2, midway between the position shown in FIG. 1 and the position shown in FIG. 2, as it is being repositioned and flexible liner 5 in its most deflected position as the movement of flexible divider 2 causes it to straighten before bending in an opposite direction from the original position in FIG. 5a. FIG. 5c shows the flexible divider 2 in the position shown in FIG. 2 and the flexible liner 5 in its normal rest position. It is to be understood that liner 5 may also be a liquid barrier.

Figure 6:
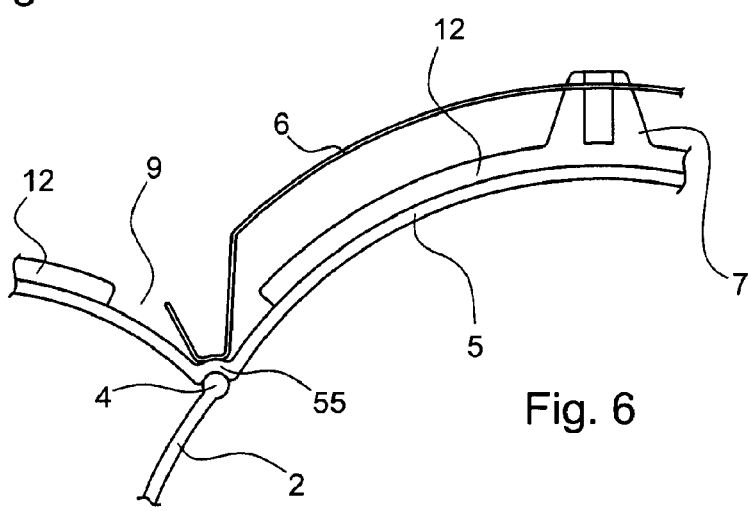
FIG. 6 shows a partial top plan view of another preferred divider mounting system.

FIG. 6 shows partial section top plan view of a preferred embodiment similar to that shown in FIGS. 5a–c with additional spring tension placed the flexible divider 2 at ends 4 mounted in grooves 55 of liner 5 located against the inside of sidewalls 12 and bottom 11 by spring 6 mounted on a spring retaining mount 7. This embodiment allows for the use of a liner 5 which is not flexible and is used to provide a liquid barrier without providing tension against said flexible divider 2.

Figure 7:
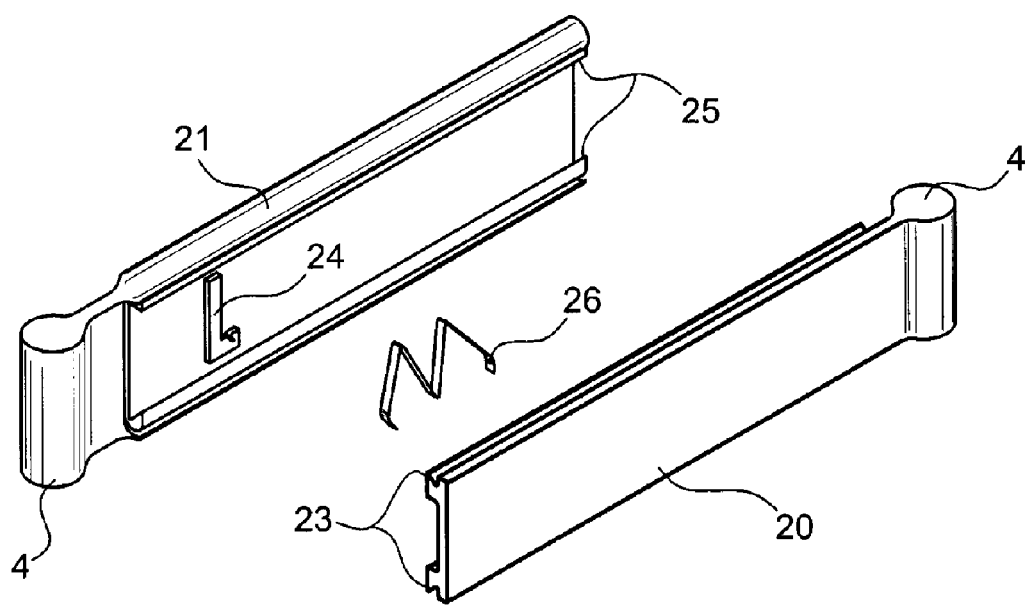
FIG. 7 shows an exploded perspective view of one preferred length adjustable divider for use in the present invention.

FIG. 7 shows yet another preferred embodiment of the present invention wherein the spring tension on the flexible divider 2 is provided by a spring 26 located between two cooperating portions 20 and 21 forming said flexible divider 2. Flexible divider 2 is formed by a portion 20 having an end 4 an outside face and an inside face, said inside face having located thereon a pair of tongues 23 running parallel to the longitudinal axis of portion 20, and a portion 21 having an end 4 an outside face and an inside face, said inside face having located thereon a pair of grooves 25 located to cooperatively engage the pair of tongues 23 of portion 20. Both portions 20 and 21 have a spring mounting bracket 24 located on their respective inside faces to cooperatively retaining spring 26 there between.

Figure 8:
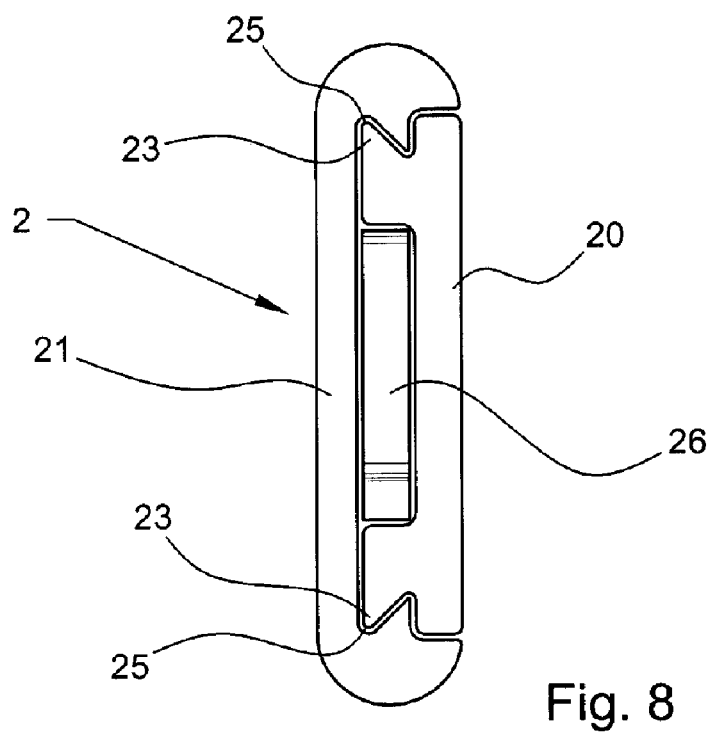
FIG. 8 shows a cross-section end view of the preferred divider of FIG. 7.

Finally FIG. 8 shows an end cross section plan view of the flexible divider 2 of FIG. 7 assembled with the tongues 23 of portion 20 engaged in the grooves 25 of portion 21 and having spring 26 mounted in the spring mounting brackets 24 (FIG. 7) located between said portions 20 and 21. The spring 26 can comprise any well-known spring material, presently preferred is flat spring steel.

The storage compartment 10 may be made from materials well known in the art, particularly moldable materials, and most particularly injection moldable materials, such as for example, polycarbonate acrylonitrile-butadiene-styrene (PCABS) being of a hard durometer.

The flexible and/or liquid barrier liner 5 may be made from any well known material, particularly those which may be injection molded into or simultaneously with the storage compartment. Preferred liner 5 materials include, for example, soft rubber-like polymers such as polyvinylchloride (PVC). Likewise, the flexible closeout 8 may be made from any suitable material including for example, soft rubber-like polymers such as polyvinylchloride (PVC).

The dividers 2 are preferably composed of a soft flexible elastomeric material, particularly soft rubber-like polyvinylchloride (PVC).

Although the preferred embodiments of the present invention has been disclosed, various changes and modifications may be made without departing from the scope of the invention as set forth in the appended claims.

What is claimed is:

1. A storage compartment and divider assembly adapted for use in a vehicle for supporting containers, the vehicle having a receiving aperture for receiving the storage compartment and divider assembly, the storage compartment and divider assembly comprising:

a storage tray having a bottom and sidewalls proportioned to accept various sized containers wherein said sidewalls have two pair of opposing openings;

two invertible flexible dividers, each said divider mounted in one pair of said opposing openings in said storage tray sidewalls, and side invertible flexible dividers defining one large container holder or two small container holders; and an invertible flexible divider tensioning device to maintain the desired position of said divider;

thereby providing for securing various sized beverage containers and the like in a vehicle.

2. The storage compartment and divider assembly as claimed in claim 1 wherein, said sidewall openings have mounted therein, flexible closeouts through which the ends of said invertible flexible dividers are mounted.

3. The storage compartment and divider assembly as claimed in claim 1 wherein, the ends of said invertible flexible dividers have mounted therein the ends of a generally U-shaped wire spring acting as a tensioning device.

4. The storage compartment and divider assembly as claimed in claim 1 wherein, said storage compartment is molded of polycarbonate acrylonitrile-butadiene-styrene.

5. The storage compartment and divider assembly as claimed in claim 1 wherein, said invertible flexible dividers are molded of a soft flexible elastomeric material, particularly soft rubber-like polyvinylchloride.

6. The storage compartment and divider assembly as claimed in claim 2 wherein, said flexible closeouts are molded of a soft flexible elastomeric material, particularly soft rubber-like polyvinylchloride.

7. A storage compartment and divider assembly adapted for use in a vehicle for supporting containers, the vehicle having a receiving aperture for receiving the storage compartment and divider assembly, the storage compartment and divider assembly comprising:

a storage tray having a bottom and sidewalls proportioned to accept various sized containers wherein said sidewalls have two pair of opposing openings;

a liner mounted within said storage tray and having an invertible flexible divider end mounting groove located over each of said two pair of opposing openings;

two invertible flexible dividers, each said divider mounted in one pair of said mounting grooves in said liner located over each of said opposing openings in said storage tray sidewalls, and side invertible flexible dividers defining one large container holder or two small container holders; and an invertible flexible divider tensioning device to maintain the desired position of said divider;

thereby providing for securing various sized beverage containers and the like in a vehicle.

8. The storage compartment and divider assembly as claimed in claim 7 wherein, said liner provides the spring tensioning for the invertible flexible dividers.

9. The storage compartment and divider assembly as claimed in claim 7 wherein, the tensioning devices comprise springs mounted on the storage tray sidewalls and having ends applying tension against the flexible liner mounting grooves.

10. The storage compartment and divider assembly as claimed in claim 7 wherein, said invertible flexible dividers are comprised of one-piece units.

11. The storage compartment and divider assembly as claimed in claim 7 wherein, said invertible flexible dividers are comprised of a first piece having a pair of tongues slidably mounted in a second piece having a pair of cooperating grooves, and a tensioning spring mounted between said first piece and said second piece providing the tensioning of said invertible flexible dividers.

12. The storage compartment and divider assembly as claimed in claim 7 wherein, said storage compartment is molded of polycarbonate acrylonitrile-butadiene-styrene (PCABS).

13. The storage compartment and divider assembly as claimed in claim 7 wherein, said invertible flexible dividers are molded of a soft flexible elastomeric material, particularly soft rubber-like polyvinylchloride (PVC).

14. The storage compartment and divider assembly as claimed in claim 7 wherein, said flexible closeouts are molded of a soft flexible elastomeric material, particularly soft rubber-like polyvinylchloride (PVC).

* * * * *